3,375,226
SUBSTITUTED PHENOXY COMPOUNDS AND CURED POLYEPOXIDES OBTAINED THEREFROM
Ralph F. Sellers, Somerset, Samuel G. Smith, Jr., Hillsborough Township, and Allison S. Burhans, Bernards Township, N.J., assignors to Union Carbide Corporation, a corporation of New York
No Drawing. Filed Jan. 28, 1966, Ser. No. 523,533
16 Claims. (Cl. 260—47)

This invention relates to substituted phenoxy compounds, to epoxy compounds derived therefrom and to curable compositions and cured products based on the epoxy compounds. More particularly, this invention relates to epoxy compounds which can be cured to infusible products characterized by excellent compressive modulus, excellent compressive yield strength and by excellent resistivity to crack propagation.

The cured products of this invention, by reason of their excellent compressive modulus, excellent compressive yield strength and their excellent resistivity to crack propagation, are highly attractive for use as binders in filament wound, deep sea submergence vehicles and in structural laminates which are to be subjected to high compressive forces.

The present invention provides cured products which are characterized by a compressive modulus (ASTMD–695–61) as high as about 700,000 p.s.i. and a compressive yield strength (ASTMD 695–61) as high as about 30,000 p.s.i.

The compounds of this invention can be represented structurally by Formulas I–IV which appear below.

Formula I

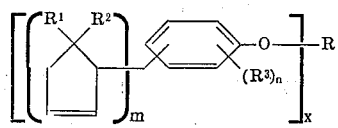

wherein R is a hydrocarbon radical having a valence of 2 to 4 inclusive, generally containing 1 to 30 carbon atoms inclusive and preferably containing 2 to 18 carbon atoms inclusive, $x$ is an integer equal in value to the valence of R, $R^1$ and $R^2$, which can be the same or different, are hydrogen or alkyl having a maximum of six carbon atoms, $R^3$ is an alkyl radical containing a maximum of six carbon atoms, an alkoxy radical containing a maximum of six carbon atoms or halogen, i.e., chlorine, bromine, iodine and fluorine, $m$ is an integer having a value of one to three inclusive, $n$ is an integer having a value of 0 to $5-m$ inclusive and with the further limitation that each cyclopentenyl group is in a position other than meta to the —O—R group.

Formula II

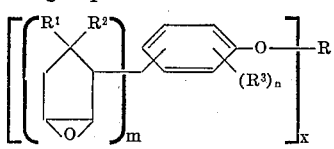

wherein R, $R^1$, $R^2$, $R^3$, $m$, $n$ and $x$ are as previously defined and the position of each epoxidized cyclopentyl group is in a position other than meta to the —O—R group.

Formula III

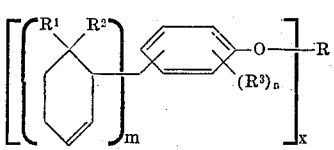

wherein R, $R^1$, $R^2$, $R^3$, $m$, $n$ and $x$ are as previously defined and each cyclohexenyl group is in a position other than meta to the —O—R group.

Formula IV

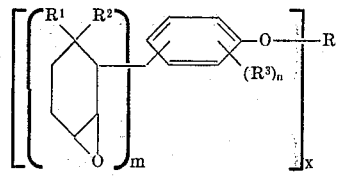

wherein R, $R^1$, $R^2$ $R^3$, $m$, $n$ and $x$ are as previously defined and each epoxidized cyclohexyl group is in a position other than meta to the —O—R group.

As previously stated, R is a hydrocarbon radical having a valence of two to four inclusive and generally containing from one to 30 carbon atoms inclusive. Among suitable radicals can be noted the following: alkylene radicals having the formula $-(C_aH_{2a})-$ wherein $\alpha$ is an integer having a value of one to 30 inclusive, preferably one to 18 inclusive; an alkylene radical as defined having one or more hydroxyl substituents; alkylene radicals as defined, interrupted by oxygen atoms; alkylene radicals interrupted by oxygen atoms and nuclei of polyhydric phenols, preferably dihydric phenols, such as radicals having the formula $-(C_aH_{2a})_\beta Ar-(O-C_aH_a)_\beta$ wherein the values of $\alpha$ and $\beta$ are such that the radicals contain a maximum of 30 carbon atoms and Ar is the nucleus of a polyhydric phenol such as phenylene and the like; trivalent and tetravalent hydrocarbon radicals, for instance, a trivalent hydrocarbon radical having the formula

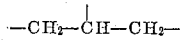

and a tetravalent hydrocarbon radical having the formula:

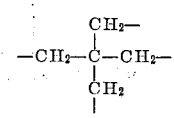

other suitable polyvalent hydrocarbon radicals are the aromatic radicals such as phenylene, 1,4′ - (2 - methylphenylene), 1,4′-(2-n-propoxyphenylene) a radical

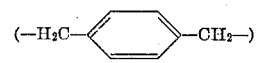

derived from 1,4-dimethyl benzene, a radical

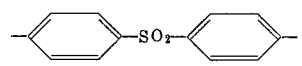

derived from diphenyl sulfone, a radical

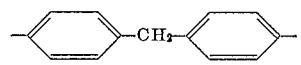

derived from diphenylmethane, a radical

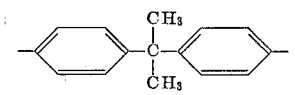

derived from diphenyl propane, cycloaliphatic radicals such as a radical

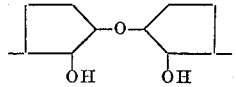

derived from bis(2,3-epoxycyclopentyl)ether and the like.
Preparation of compounds falling within the scope of Formula III can be accomplished in a number of convenient ways. For example, a compound of the formula:

(Formula V) 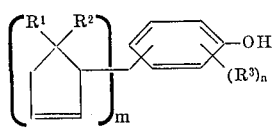

or a compound of the formula:

(Formula VI) 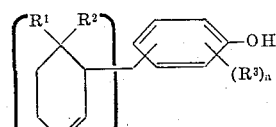

wherein $R^1$, $R^2$, $R^3$, $m$, $n$ and the position of each unsaturated cycloaliphatic radical are as previously defined, is reacted, in the presence of an alkali metal hydroxide, with a compound containing at least two halogen atoms, preferably chlorine atoms. In this reaction, a compound of Formula V or of Formula VI reacts through its hydroxyl group with a halogen of the co-reactant, previously described. One hydroxyl group is deemed to react with one halogen atom.

The reaction between a compound falling within the scope of Formula V and a compound containing at least two halogen atoms can be illustrated by the following reaction.

(Reaction No. 1)

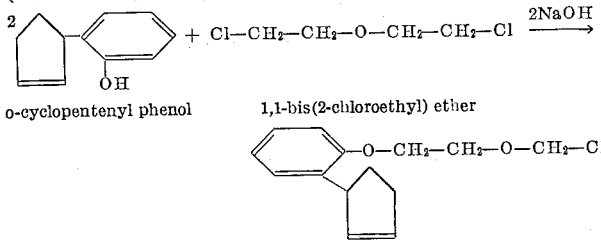

Compounds falling within the scope of Formula VI react in the same manner.

Among halogenated compounds which are suitable for reaction with compounds falling within the scope of Formulas V and VI can be noted: dihaloalkanes having the formula: $Hal$–$(C_\alpha H_{2\alpha})$–$Hal$ wherein $\alpha$ is as previously defined, such as 1,2-dichloroethane, 1,4-dichlorobutane, 1,6-dichlorohexane, 1,10-dichlorodecane, 1,4-dichloro-2-ethylhexane, 1,4-dibromo-2-hydroxydecane, 1,20-dichloroeicosane and the like, compounds made up of alkylene radicals interrupted by oxygen atoms such as di(2-chloroethyl)ether, di(4-dichlorobutyl)ether and the like, compounds made up of alkylene radicals interrupted by oxygen atoms and nuclei of polyhydric phenols such as 1,4-bis(2-chloroethoxy)benzene, aromatic compounds such as hexachlorobenzene, p-$\alpha,\alpha'$-dichloroxylylene, 4,4'-dichlorodiphenyl sulfone, 4,4'-dichlorodiphenylmethane and the like, cycloaliphatic compounds such as dichlorocyclohexane and the like.

As an alternative method for producing compounds of this invention which contain hydroxyl groups, a compound falling within the scope of Formula V or Formula VI is reacted with a polyepoxide (polyglycidyl ethers of polyhydric phenols, enumerated in U.S. Patent 2,898,349, polyglycidyl ethers of polyhydric alcohols, enumerated in U.S. Patent 2,633,458, peracetic acid type epoxides, enumerated in U.S. Patent 2,750,395 or with an epihalohydrin having the formula:

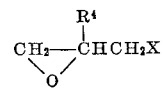

wherein $R^4$ is hydrogen or methyl and X is halogen, preferably chlorine.

This "alternative" method can be illustrated by the following reactions:

(Reaction No. 2)

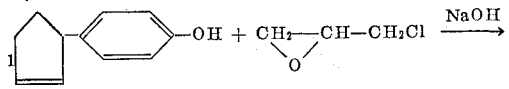

p-cyclopentenylphenol    epichlorohydrin

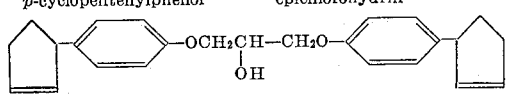

(Reaction No. 3)

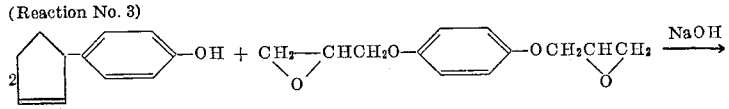

p-cyclopentenyl phenol    diglycidyl ether of hydroquinone

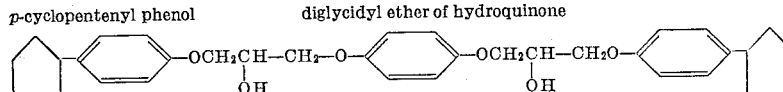

(Reaction No. 4)

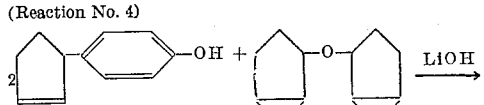

p-cyclopentenylphenol    bis-(2,3-epoxycyclopentyl) ether

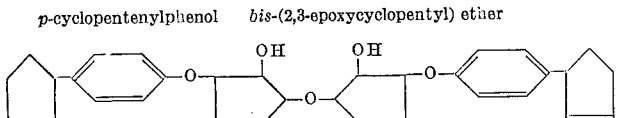

(Reaction No. 5)

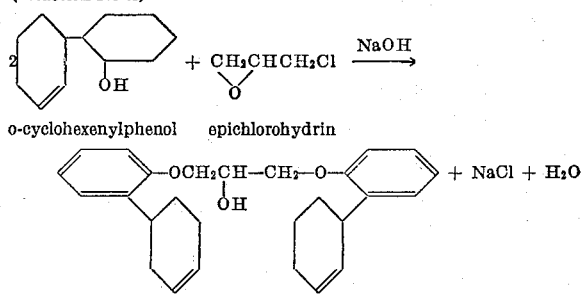

In reacting a compound of Formula V or Formula VI with a halogenated compound or with an epoxide as described, it is customary to react one mole of the phenolic compound (Formula V and Formula VI) per each halogen or epoxy equivalent desired to be replaced, in the presence of an alkali metal hydroxide. In conducting this reaction, its is customary to employ dimethyl sulfoxide as the medium in which the reaction is conducted. The reaction is generally conducted at a temperature of about 25° C. to 200° C. The reaction product is recovered by diluting the crude product with methylisobutyl ketone, water washing and stripping off the volatiles by vacuum distillation.

Compounds falling within the scope of Formula V and Formula VI can be conveniently prepared according to the procedure described in British Patent 741,446 and also according to the procedure described in a book by George A. Olah, entitled, "Friedel-Crafts Reactions," part I (chapter XV), Interscience Publishers, 1964, by reacting a cyclopentadiene or a cyclohexadiene with a phenol, such as phenol; alkylated phenols, exemplary of which are m-cresol, o-ethyl phenol, m-ethyl phenol, p-isopropyl phenol, m-tert-butyl phenol, o-amyl phenol, p-n-hexyl phenol, 2,4-dimethyl phenol, 2,4-diethyl phenol, 2,4-di-n-hexyl phenol, 2,3,5-triethyl phenol, 2,3,5-trihexyl phenol, 2,3,4,5-tetra-n-hexyl phenol, and other like phenols, as well as the commercially available meta-cresol which contains small amounts of both the para and the ortho isomers; alkoxylated phenols, exemplary of which are m-methoxy phenol, o-methoxy phenol, p-methoxy phenol, m-n-hexoxy phenol, o-n-hexoxy phenol, p-n-hexoxy phenol, 2,4-dimethoxy phenol, 2,4-di-n-hexoxy phenol, 2,3,5-trimethoxy phenol, 2,3,5-tri-n-hexoxy phenol, 2,3,4,5-tetra-n-hexoxy phenol and the like; halogenated phenols such as ortho, meta or para chloro phenol, ortho, meta or para bromo phenol, 2,4-dichlorophenol and 2,3,5-trichlorophenol and the like.

Compounds falling within the scope of Formula II and Formula IV can be conveniently prepared by epoxidizing compounds falling within the scope of Formula I and Formula III respectively, utilizing peracetic acid, in a manner as described in this specification and also in a manner as described in U.S. Patent 2,750,395 to B. Phillips et al.

Epoxides of this invention can be cured to infusible products by being heated at elevated temperatures, generally on the order of about 50° C. to about 200° C. Since the self-cure of these epoxides, at elevated temperatures, requires more than a day, it is customary to add curing agents thereto, prior to the heating cycle, in order to effect a cure in a reasonable period of time. Any of the epoxy curing agents can be used for this purpose. The curing agents can be catalysts, that is, compounds which primarily catalyze the curing reaction, or hardeners, compounds which react with the epoxides.

Suitable hardeners are the polyamines (described in U.S. Patent 2,935,488; the polycarboxylic acids and anhydrides thereof described in U.S. Patent 2,921,925 to B. Phillips et al.

For purposes of stoichiometric calculations: one epoxy group is deemed to react with one amino-hydrogen atom; one epoxy group is deemed to react with one carboxyl group; and one epoxy group is deemed to react with one anhydride group.

Particularly desirable hardeners for purposes of this invention are the aromatic amine hardeners. Cured products of curable compositions containing aromatic amine hardeners have exceptionally high compressive modulus and yield strength as well as excellent resistivity to crack propagation.

Among suitable aromatic amines are those having two or more and preferably at least three amino-hydrogen atoms per molecule, as for example, those having the formula:

(Formula VII)

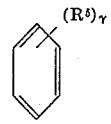

wherein each $R^5$, which can be the same or different, is halogen, e.g., chlorine, bromine and the like; primary amino groups; or hydrocarbon radicals, generally containing one to 20 carbon atoms inclusive and preferably containing one to 10 carbon atoms inclusive and $\gamma$ is a whole number having a value of one to six inclusive; provided the compound contains two or more amino-hydrogen atoms per molecule.

Illustrative of hydrocarbon radicals for $R^5$ are alkyl radicals, generally containing one to 20 carbon atoms inclusive and preferably containing one to 10 carbon atoms inclusive, such as methyl, ethyl, n-propyl, isopropyl, n-butyl, n-decyl and the like; cycloalkyl radicals, generally containing three to 20 carbon atoms inclusive and preferably containing three to 10 carbon atoms inclusive, such as cyclohexyl and the like; unsaturated alicyclic and unsaturated aliphatic hydrocarbon radicals, generally containing from two to 20 carbon atoms inclusive and preferably containing two to 10 carbon atoms inclusive, such as cyclopentenyl, allyl and the like; halogenated alkyl and cycloalkyl radicals, generally containing one to 20 corbon atoms inclusive and preferably containing one to 10 carbon atoms inclusive, such as chloroethyl, bromoethyl, fluoroethyl, 2 - chloro-n-propyl, 2 - bromo-n-propyl, 2-chloro-n-butyl and the like; alkoxy and aryloxy substituted alkyl and cycloalkyl radicals, generally containing 2 to 20 carbon atoms inclusive and preferably containing 2 to 10 carbon atoms inclusive, such as methoxymethyl, ethoxyethyl, 3 - ethoxy-n-propyl, 4 - ethoxy-n-butyl, 2-methoxycyclohexyl, phenoxymethyl, 2 -phenoxyethyl and the like; aryl radicals, generally containing 6 to 20 carbon atoms inclusive and preferably containing 6 to 18 carbon atoms inclusive, such as phenyl, tolyl and the like, as well as halogenated aryl radicals, such as p-chlorophenyl, p-bromophenyl, p-fluorophenyl, p-iodophenyl and the like; alkoxy and aryloxy substituted aryl radicals, generally containing 7 to 20 carbon atoms inclusive and preferably containing 9 to 18 carbon atoms inclusive, such as p-methoxyphenyl, p-ethoxyphenyl, p-n-propoxyphenyl and the like; alkaryl radicals, such as o-methylphenyl, p - ethylphenyl, p - n-propylphenyl, o-n-propylphenyl and the like; also those hydrocarbon radicals, as described, which are substituted with one or more amino groups.

Exemplary of such aromatic amines are the following: o-phenylenediamine, p - phenylenediamine, m - phenylenediamine, benzidine, o-tolidine, o-dianisdine and the like.

Particularly desirable aromatic amines falling within the scope of Formula VII are those amines having the formula:

(Formula VIII)

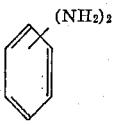

Among other suitable aromatic amines are those having the formula:

(Formula IX) 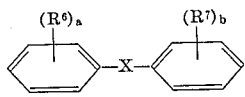

wherein $R^6$ and $R^7$ are as defined for $R^5$, $a$ and $b$ are whole numbers having a value of 1 to 5 inclusive and X is a divalent radical, as for example; —C—, —O—, —S—, —SO$_2$—, —S—S— or a divalent hydrocarbon radical, wherein the amine contains at least two primary amino groups per molecule, as described, and these do not necessarily have to be attached to the same aromatic nucleus.

Illustrative of suitable divalent hydrocarbon radicals for X are the following divalent, aliphatic hydrocarbon radicals; alkylene radicals, generally containing 1 to 6 carbon atoms inclusive and preferably containing 1 to 4 carbon atoms inclusive, such as methylene, ethylene, trimethylene and the like; alkylidene radicals, generally containing 2 to 6 carbon atoms inclusive and preferably containing 2 to 4 carbon atoms inclusive, such as ethylidene, propylidene, isopropylidene and the like.

Particularly desirable aromatic amines falling within the scope of Formula IX are those aromatic amines having the formula:

(Formula X) 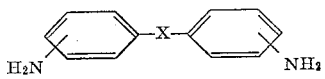

wherein X is sulfone (SO$_2$) or a divalent hydrocarbon radical, as previously described.

Also suitable for purposes of this invention are the aromatic amines produced on reacting aniline with formaldehyde. Specific aromatic amines falling within the scope of Formula X are the following: 4,4'-diaminodiphenylmethane, 4,4' - diaminodiphenylsulfone, bis - (4-amino-2-chlorophenyl)methane and the like.

In those instances in which a hardener is used, it is generally employed in amounts of about 40 percent of stoichiometric to about 60 percent in excess of stoichiometric. As a rule, it is preferred to use about stoichiometric amounts.

Illustrative of suitable catalysts which can be used to initiate the self-cure of the epoxides of this invention are tertiary amines such as benzyldimethylamine and the like, quaternary ammonium compounds, boron trifluoride complexes such as boron trifluoride etherate complex, boron trifluoride monoethylamine complex and the like, uranyl nitrate, uranyl esters and the like.

In those instances wherein a catalyst is used, it is employed in at least catalytic amounts, that is, amounts sufficient to initiate the self-cure of the epoxides. Generally the catalyst is used in amounts of from about 0.2 to about 5 percent by weight and preferably from about 0.5 to about 2 percent by weight based on the weight of the epoxides. More than about 5 percent by weight of catalyst can be used but this does not materially decrease the time of the curing cycle and is, therefore, economically undesirable.

The epoxides of this invention, which contain more than one epoxy group per molecule, can be used in every application now served by epoxides, as for example, in epoxy tooling and abrasive wheel applications, in electrical relays, gears and bearings. Also, the epoxies can be used in molding and casting applications to form shaped articles of desired form.

Particularly desirable applications of the epoxides of this invention is in the preparation of laminates and filament-wound structures using aromatic amines as hardening agents. In producing a composition suitable for this purpose, the polyepoxide in combination with an aromatic amine hardener is dissolved in any suitable organic solvent to form a solution having a solids content of about 30 to about 70 percent by weight. As a rule, the organic solvent used is a ketone, such as methylethyl ketone, diisopropyl ketone and the like. This solution is then used to impregnate, by any suitable method, for example, dipping, spraying and the like any desired material, for instance, glass cloth, glass filaments, carbon cloth, carbon filaments, nylon filaments, metal fibers, paper and the like. The solvent is removed from the impregnated material and the impregnated material is then formed into a desired shape and the composition cured to its infusible state.

The temperature to which each impregnated material is heated in order to effect a cure of the composition will, of course, vary and depend, in part, upon the exact formulation of the composition. As a rule, this temperature is in the range of about 100° C. to about 200° C. for a period of time ranging from about 1 to 6 hours. In the production of laminates, it is also customary to subject the impregnated material to elevated pressures.

The following examples further illustrate the present invention and are not intended to limit the scope thereof in any manner.

*Example 1*

This example illustrates the preparation of a compound having the formula:

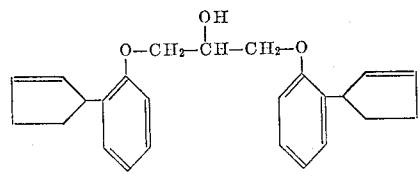

Into a reaction flask, there was charged 566 grams of o-cyclopentenyl phenol (3.54 moles), 164 grams of epichlorohydrin (1.77 moles) and 283 grams of ethyl alcohol. The mixture was heated to a temperature of 60° C. and held at a temperature of 60° C.–65° C. while 156 grams of sodium hydroxide (50% aqueous solution) were added thereto over a period of one hour. The reactants in the flask were maintained at a temperature of 60° C.–65° C. for one hour after which time ethyl alcohol and water were distilled off under a vacuum of 50 mm. Hg pressure to a pot temperature of 70° C. The organic portion of the residue was dissolved in 885 grams of toluene and the resultant solution washed five times with 550 gram portions of water. The toluene was distilled off under a vacuum of 50 mm. Hg pressure to a pot temperature of 135° C. leaving 631 grams of a clear, dark amber liquid. This product, having the formula noted above, had a viscosity at 25° C. of 1000 centistokes.

*Example 2*

This example illustrates the preparation of a compound having the formula:

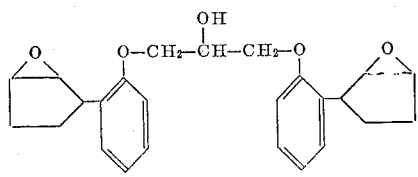

0.231 mole of the compound of Example 1 was placed in a flask which was fitted with a stirrer and external cooling means and 188 grams of 23.4 percent solution of peracetic acid in ethyl acetate was added dropwise into the flask over a period of 25 minutes. During the addition and for two hours thereafter, the reaction solution was maintained at a temperature of about 35° C. At the end of this period an analysis for peracetic acid indicated that 97.8 percent of the theoretical peracetic acid had been consumed. The reaction solution was then added dropwise to a still kettle containing ethyl benzene which was refluxing under a pressure of 25 mm. Hg. During the addition, enough material was being distilled so that a head temperature of 30° C.–32° C. was maintained. After this addition, a low boiling material was distilled up to the boiling point of pure ethyl benzene. The residue product, which analyzed 0.14 percent acetic acid, was then purified in a molecular still yielding a clear, yellow semi-solid.

*Analysis.*—Epoxy assay=211.9 grams/gram equivalent.

*Example 3*

This example illustrates the preparation of a compound having the formula:

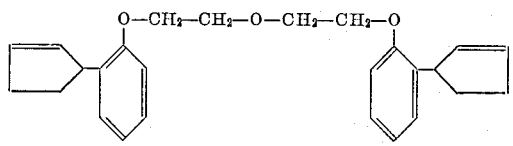

Into a reaction flask there was charged 960 grams of o-cyclopentenyl phenol (6 moles) and 1500 grams of dimethyl sulfoxide. To this mixture was then added 492 grams of sodium hydroxide (50% aqueous solution) over a 25 minute period. During this addition, the temperature of the mixture rose to 72° C. After the caustic addition was completed, the resultant mixture was heated to and maintained at a temperature of 100° C. while 429 grams of bis(2-chloroethyl)ether were added thereto dropwise. The contents of the flask were maintained at a temperature of about 100° C. for 90 minutes. After the 90 minute period, the reaction flask was fitted with a Dean-Stark trap and 700 grams of benzene were introduced into the reaction flask. The water in the reaction flask was azeotroped and collected in the Dean-Stark trap. The product in the flask was cooled to a temperature of about 50° C. and the salts of reaction removed by filtration. One thousand and fifty grams of product, having the formula noted above, were recovered after removal of benzene and dimethyl sulfoxide by vacuum distillation (pressure of 22 mm. Hg, pot temperature 193° C.). The product, having the formula noted above, was a soft solid at room temperature.

*Example 4*

The product of Example 3 was epoxidized in a manner described in Example 2 to an epoxide having the formula:

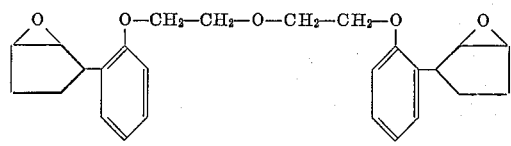

This epoxidized product was a clear, yellow semi-solid having an epoxy assay of 219.6 grams/gram equivalent epoxy.

In a manner described in Example 1 and Example 2, the following compounds were produced.

*Example 5*

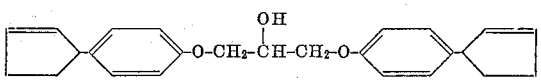

*Example 6*

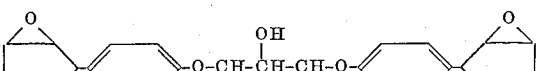

*Example 7*

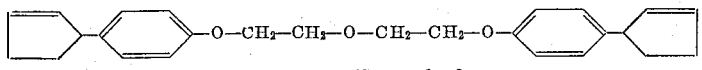

*Example 8*

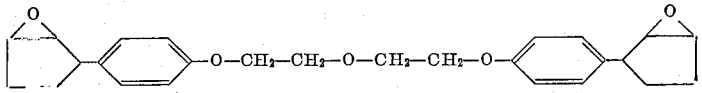

To further illustrate the excellent properties of the compounds of this invention, the epoxides of Examples 2, 4, 6 and 8 were formed into castings and the castings cured and tested. In producing the cured castings, each epoxide was heated to a temperature of 120° C., blended with a stoichiometric amount of m-phenylenediamine, which had also been heated to a temperature of 120° C., and the resultant blend poured into molds preheated to a temperature of 120° C. The castings were then cured to infusible products according to the following heating cycle:

18 hours at 120° C.
24 hours at 160° C.
6 hours at 200° C.

Properties of the cured castings are indicated in Table I which follows:

TABLE 1

| | Tensile Properties | | | Compressive Properties | | | | Stress Intensity Factor, lbs/in., 1.5 |
|---|---|---|---|---|---|---|---|---|
| | Modulus, p.s.i.×10⁵ | Ultimate Strength, p.s.i.×10³ | Elong., Percent | Modulus, p.s.i.×10⁵ | Yield Strength, p.s.i×10³ | Yield at 2% Offset, p.s.i.×10³ | Deform., Percent | |
| Epoxide of Example 2 | 6.06 | 10.4 | 1.9 | 7.43 | 28.1 | 27.9 | 6.0 | 1,190 |
| Epoxide of Example 4 | 5.74 | 4.3 | 0.6 | 7.19 | 22.6 | | 3.8 | 1,238 |
| Epoxide of Example 6 | 5.29 | 13.8 | 3.7 | 5.58 | 23.1 | 22.9 | 7.2 | 1,261 |
| Epoxide of Example 8 | 4.28 | 11.0 | 3.3 | 5.47 | 18.4 | 17.4 | 5.5 | 1,251 |

What is claimed is:
1. A substituted phenoxy compound selected from the group consisting of compounds having the formula:

(a) 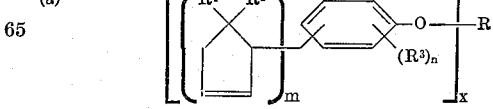

wherein R is a hydrocarbon radical having a valence of 2 to 4 inclusive, $x$ is an integer equal in value to the valence of R, $R^1$ and $R^2$ are hydrogen or alkyl containing a maximum of 6 carbon atoms, $R^3$ is an alkyl radical containing a maximum of 6 carbon atoms, an alkoxy radical containing a maximum of 6 carbon atoms or halogen, $m$ is an integer having a value of 1 to 3 inclusive, $n$ is an integer having a value of 0 to 5-$m$ inclusive and with the further limitation that each cyclopentenyl group is in a position other than meta to the —O—R group;

(b) 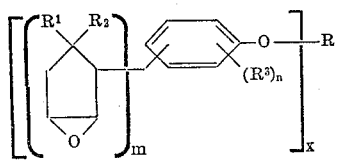

wherein R, $R^1$, $R^2$, $R^3$, $m$, $n$ and $x$ are as defined in (a) and the position of each epoxidized cyclopentyl group is in a position other than meta to the —O—R group;

(c) 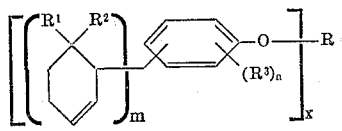

wherein R, $R^1$, $R^2$, $R^3$, $m$, $n$ and $x$ are as defined in (a) and the position of each cyclohexenyl group is in a position other than meta to the —O—R group;

(d) 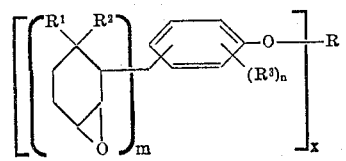

wherein R, $R^1$, $R^2$, $R^3$, $m$, $n$ and $x$ are as defined in (a) and the position of each epoxidized cyclohexyl group is in a position other than meta to the —O—R group.

2. A compound as defined in claim 1(a) having the formula:

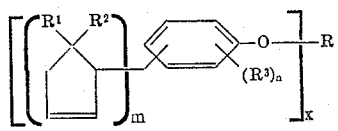

wherein R, $R^1$, $R^2$, $R^3$, $m$, $n$, $x$ and the position of each cyclopentenyl group are as defined in claim 1(a).

3. A compound as defined in claim 1(b) having the formula:

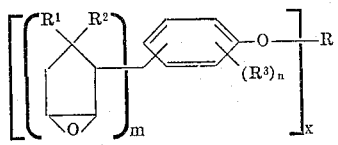

wherein R, $R^1$, $R^2$, $R^3$, $m$, $n$, $x$ and the position of each epoxidized cyclopentyl group are as defined in claim 1(a).

4. A compound as defined in claim 1(c) having the formula:

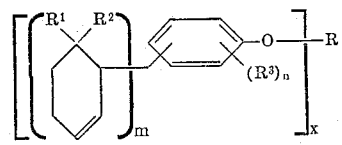

wherein R, $R^1$, $R^2$, $R^3$, $m$, $n$, $x$ and the position of each cyclohexenyl group are as defined in claim 1(a).

5. A compound as defined in claim 1(d) having the formula:

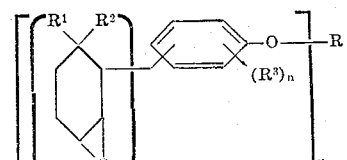

wherein R, $R^1$, $R^2$, $R^3$, $m$, $n$, $x$, and the position of each epoxidized cyclohexyl group are as defined in claim 1(d).

6. The cured product of an epoxide compound defined in claim 1.

7. A curable composition comprising an epoxide curing compound defined in claim 1 in admixture with an epoxy agent.

8. A curable composition as defined in claim 7 wherein the curing agent is an aromatic amine having more than 2 amino hydrogen atoms per molecule.

9. A compound as defined in claim 1(a) having the formula:

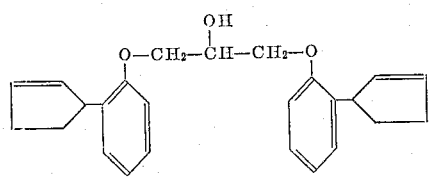

10. A compound as defined in claim 1(b) having the formula:

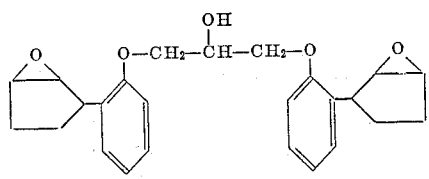

11. A compound as defined in claim 1(a) having the formula:

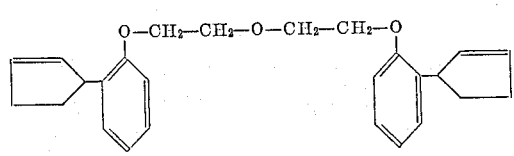

12. A compound as defined in claim 1(b) having the formula:

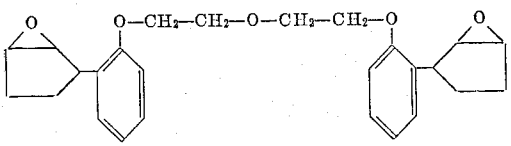

13. A compound as defined in claim 1(a) having the formula:

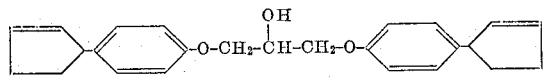

14. A compound as defined in claim 1(b) having the formula:

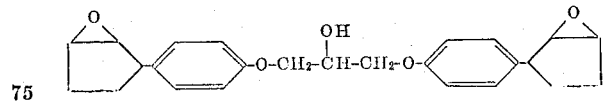

15. A compound as defined in claim 1(*a*) having the formula:
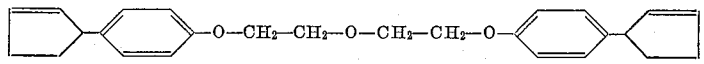
16. A compound as defined in claim 1(*b*) having the formula:
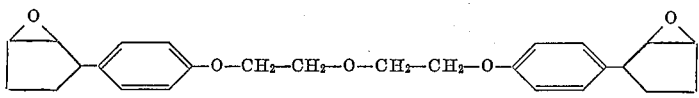
References Cited
UNITED STATES PATENTS
3,274,126  9/1966  Holm _____ 260—2
WILLIAM H. SHORT, *Primary Examiner.*
T. D. KERWIN, *Assistant Examiner.*

UNITED STATES PATENT OFFICE
CERTIFICATE OF CORRECTION

Patent No. 3,375,226

April 26, 1968

Ralph F. Sellers et al.

It is certified that error appears in the above identified patent and that said Letters Patent are hereby corrected as shown below:

Column 2, line 22, "$\{C_\alpha H_{2\sigma}\}_\beta Ar-(O-C_\alpha H_\alpha)_\beta$" should read -- $\{C_\alpha H_{2\alpha}O\}_\beta Ar-(O-C_\alpha H_{2\alpha}\}_\beta$ --. Column 12, line 6, cancel "curing"; line 7, "epoxy agent" should read -- epoxy curing agent --.

Signed and sealed this 10th day of March 1970.

(SEAL)
Attest:

Edward M. Fletcher, Jr.

Attesting Officer

WILLIAM E. SCHUYLER, JR.

Commissioner of Patents